E. T. POLLARD.
GEARING FOR FEED MECHANISMS.
APPLICATION FILED SEPT. 23, 1913.
1,146,814.
Patented July 20, 1915.
2 SHEETS—SHEET 1.
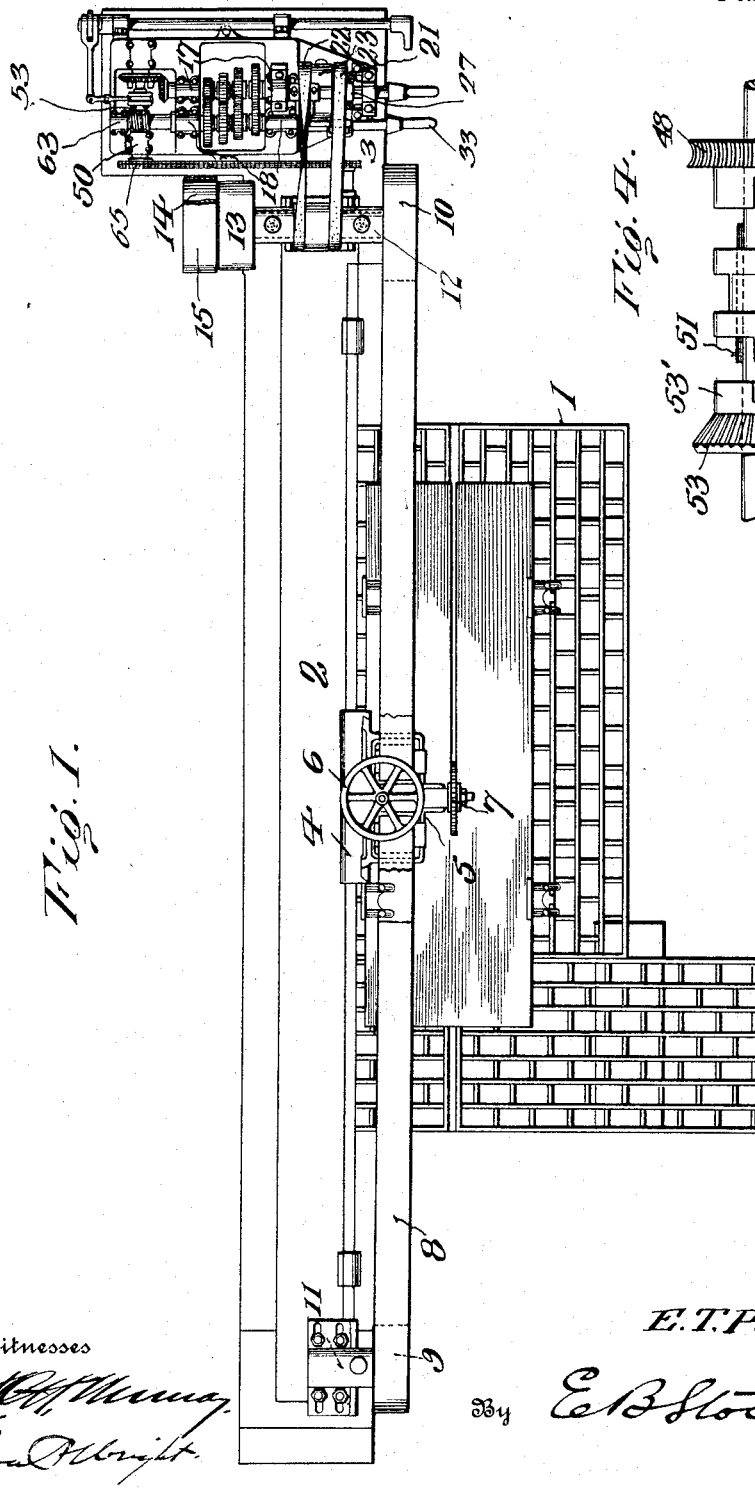
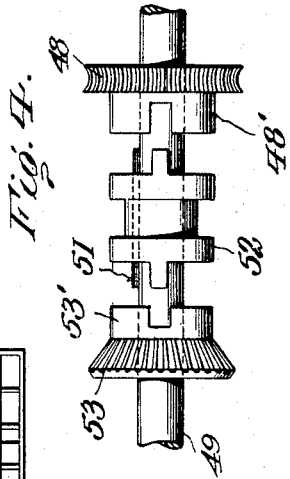
Witnesses
Inventor
E. T. Pollard
By
Attorney E. T. POLLARD.
GEARING FOR FEED MECHANISMS.
APPLICATION FILED SEPT. 23, 1913.
1,146,814.
Patented July 20, 1915.
2 SHEETS—SHEET 2.
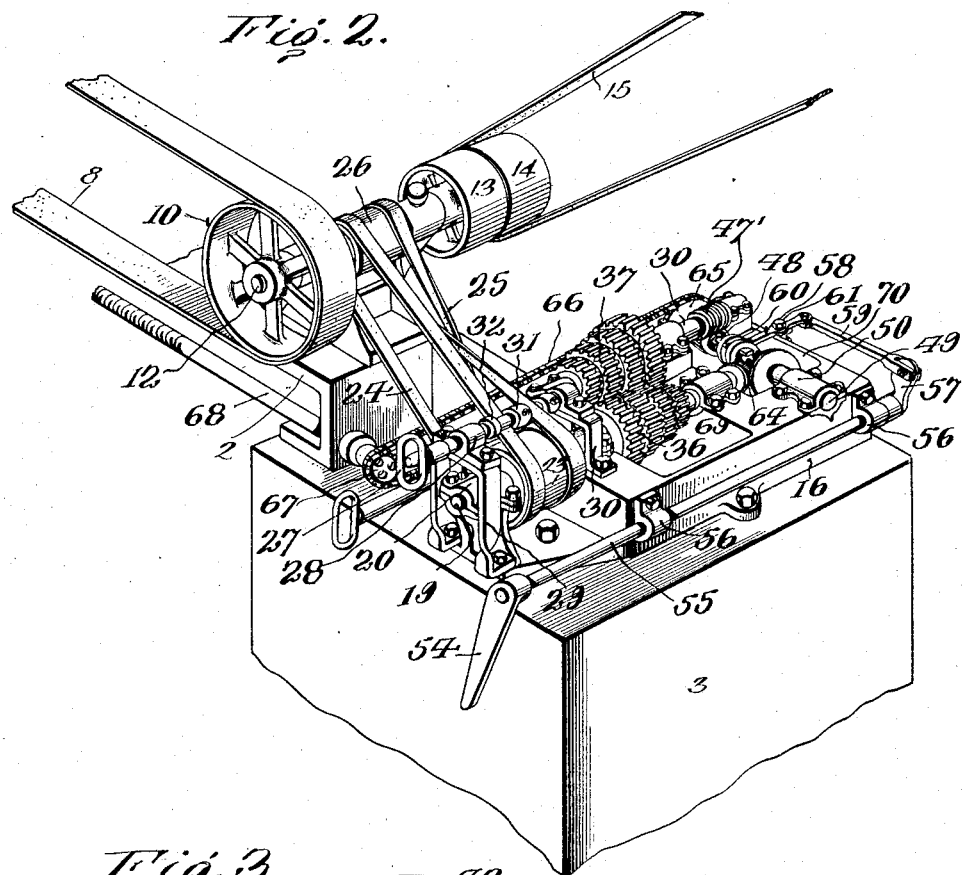
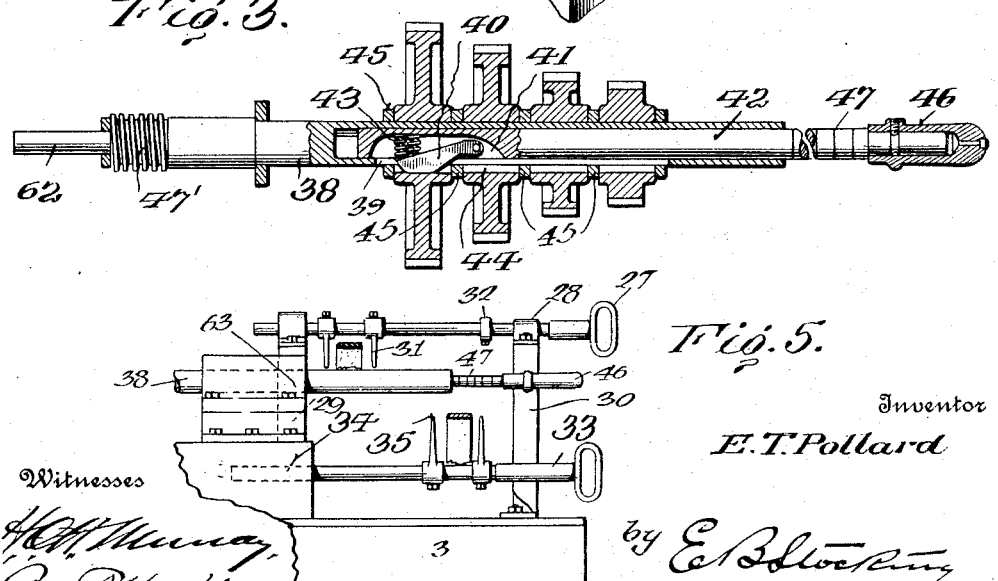
Witnesses
Inventor
E. T. Pollard
by
Attorney

UNITED STATES PATENT OFFICE.

EDSON T. POLLARD, OF NIAGARA FALLS, NEW YORK.

GEARING FOR FEED MECHANISMS.

1,146,814.  Specification of Letters Patent.  Patented July 20, 1915.

Application filed September 23, 1913. Serial No. 791,370.

*To all whom it may concern:*

Be it known that I, EDSON T. POLLARD, a citizen of the United States, residing at Niagara Falls, in the county of Niagara and State of New York, have invented certain new and useful Improvements in Gearing for Feed Mechanisms, of which the following is a specification, reference being had therein to the accompanying drawing.

This invention relates to certain new and useful improvements in gearing for feed mechanisms especially adapted to be used in connection with stone sawing machines, the object being to provide a driving mechanism by means of which the feed shaft can be driven at different rates of speed in its forward and reverse movements in order to obtain a quick return or a quick feed up to the material being sawed by the machine.

A further object of the invention is to provide a stone sawing machine in which the driving mechanism for the feed screw of the carborundum cutting wheel is mounted in such a position that the same can be readily reached by the operator of the machine, and said mechanism is inclosed in order to protect the same from dust; the change-speed gears and driving gears being lubricated by a splash system, the same being mounted to rotate in lubricant.

Another object of the invention is to provide a driving mechanism which is so constructed that the same can be readily driven in either direction through the medium of belts controlled by belt shifters in order to cause the feed screw to rotate in a reverse direction at any speed desired, through the medium of coöperating speed-changing gears.

A still further object of the invention is to provide novel means for locking the speed-changing gears on the counter-shaft through the medium of a sliding key coöperating with grooves formed in the hubs of the gears, whereby any one of the speed-changing gears can be locked to the counter-shaft or any or all of the gears on the counter-shaft, can be unlocked in order to allow the same to rotate freely.

Other and further objects and advantages of the invention will be hereinafter set forth and the novel features thereof defined by the appended claims.

In the drawings—Figure 1, is a top plan view of a stone sawing machine showing the application of my improved construction of driving mechanism thereto; Fig. 2, is a perspective of one end of the sawing machine, showing the driving mechanism; Fig. 3, is a longitudinal section through the counter shaft, key shaft and speed-changing gears; the key shaft being shown partly in elevation; Fig. 4, is a detail enlarged side elevation of the cross shaft showing the male clutch and the coöperating female clutches carried by the bevel gear and worm gear, respectively; and Fig. 5, is a side elevation of a portion of the driving mechanism showing the position of the belt shifter and key shaft.

Like numerals of reference refer to like parts in the several figures of the drawings.

In the drawing, 1 indicates a stationary platen over which is arranged a cross rail 2 mounted upon suitable supports 3 at each end and upon which, the carriage 4 is slidably mounted carrying a cutting head 5 slidably mounted in vertical guide-ways and adjusted vertically by a hand-wheel 6 mounted upon a screw, not shown, in order that the carborundum cutting wheel 7 carried by the head can be adjusted vertically in respect to the platen.

The carborundum wheel is driven by an endless belt 8 passing over pulleys 9 and 10 carried by shafts 11 and 12 mounted in suitable bearings at each end of the cross rail 2; the shaft 11 being an idle shaft and the shaft 12 a driving shaft which is provided with tight and loose pulleys 13 and 14 over which the power belt 15 passes for driving the same.

Mounted on one of the base supports 3 herein shown the one adjacent the driving shaft, is a housing 16 provided with spaced bearings 17 and 18 arranged in different horizontal planes as clearly shown; the bearings 17 having a driven shaft 19 mounted therein which extends over the reduced portion of the housing at one end and is supported by an additional bearing 20. The extension of the shaft is provided with spaced loose pulleys 21 and 22 separated by a tight pulley 23 adapted to receive either of the belts 24 or 25 which are driven by a driving pulley 26 mounted upon the driving shaft 12; the belt 24 being the forward driving means and the belt 25 being twisted to form a reverse in order that the driven shaft 19 can be driven in either direction through the medium of either one of these belts by shifting the belts from the respective loose pulleys to the tight pulley.

In order to provide means for shifting the reverse belt, I provide a belt shifter 27 mounted in suitable bearings 28 arranged on supports 29 and 30 carried by the housing and extension thereof; said belt shifter being provided with shifting fingers 31 and a stop collar 32; the outer end of the belt shifter being provided with a suitable handle for manipulating the same. The direct or forward drive belt 24 is shifted through the medium of a belt shifter 33 slidably mounted in a bore 34 formed in the housing and is provided with spaced shifting fingers 35, the outer ends of which are likewise provided with a handle for manipulating the same and it will be seen that by adjusting the belts upon the pulleys carried by the driven shaft, the same can be driven in either direction, as by throwing the direct driving belt onto the tight pulley, the shaft will be driven in one direction and by shifting the reverse belt to the tight pulley, the shaft will be driven in a reverse direction.

The driven shaft 19 is provided with a series of different-sized gears 36 which coöperate with a plurality of different-sized gears 37 loosely mounted on a tubular counter-shaft 38 mounted in the bearings 18 of the housing. The tubular counter-shaft is provided with a longitudinal slot 39 into which extends a pivoted key 40 mounted in a recess 41 of a key-shaft 42 arranged within the tubular counter-shaft and said key is held in extended position by coil-springs 43 as clearly shown in Fig. 3, which are adapted to force the key into longitudinal grooves 44 formed in the hubs of the speed gears 37; said gears being separated by washers or collars 45.

The outer end of the key-shaft is provided with a swiveled handle 46 arranged in position to be readily grasped by the operator and the outer portion of the key-shaft is provided with graduations 47 by means of which, the position of the key 40 can be determined, and it will be seen that by moving the key-shaft 42 within the tubular shaft, the key in its longitudinal movement within the tubular shaft will ride over the washers or collars 45 from one gear to the other so as to lock any one of the gears desired and when the key is thrown into engagement with one of these collars, it will be held in a compressed position so to be out of engagement with any of the gears so as to allow the gears to rotate freely and by shifting the same in either direction, can be thrown into any one of the grooves of the speed gears so as to lock the same to the tubular shaft, and it will be noted that the pivoted key 40 is provided with a rounded portion in order to allow the same to ride over the washers or collars when the key-shaft is moved longitudinally.

One end of the tubular shaft is formed solid and is provided with a worm 47' which meshes with a worm-wheel 48 loosely mounted upon a cross shaft 49 which is mounted in suitable bearings 50 and said shaft is provided with a longitudinal feather 51 upon which is slidably mounted a double male clutch member 52 one clutch portion of which is adapted to co-act with the female clutch portion 48' of the worm-wheel 48 and the other member of the male clutch member is adapted to coöperate with the female clutch portion 53' of a beveled gear 53 which is loosely mounted upon the shaft 49 and it will be seen by this construction, that the beveled gear and worm gear are allowed to rotate freely upon the shaft 50 until the same is locked to one or the other by the double clutch member. The double clutch member is operated by a lever 54 carried by the end of a shaft 55 mounted in suitable bearings 56 arranged on one side of the housing; one end of said shaft carrying a crank 57 which is connected to a pivoted lever 58 by a link 59; said lever being provided with a fork 60 embracing the grooved portion of the double clutch member so that when the lever 54 is operated so as to oscillate the shaft 55, the lever 58 will swing on its pivot 61 through the medium of the crank 57 and link 59 so as to slide the double clutch member longitudinally upon the shaft 49 into engagement with either of the clutch members of the worm gear or beveled gear.

The tubular shaft 38 is provided with a stud-shaft 62 at its end beyond the worm 47 which is mounted in a suitable bearing 63 arranged upon the housing in order to support the same beyond the worm gear. The shaft 49 is driven from the driven shaft 19 by a bevel gear 64 which meshes with the beveled gear 53 as clearly shown, whereby a direct drive from the driven shaft to the cross shaft can be obtained for the purpose hereinafter fully described.

The cross shaft 49 extends outwardly beyond the housing and carries a sprocket wheel 65 over which passes a sprocket chain 66 which passes over a sprocket wheel 67 carried by one end of a feed shaft 68 mounted in the cross rail; and said feed shaft extends through suitable nuts carried by the carriage mounted upon the cross rail in order that the same may be moved longitudinally upon the cross rail in either direction through the medium of the driving mechanism at different rates of speed in either direction.

The housing 16 is provided with oil cups or basins 69 and 70 in which the change-speed gears and bevel and worm gears rotate in order to keep the same thoroughly lubricated and while in the drawings, I have shown the driving mechanism arranged in the housing without a cover, it is of course understood that the housing is provided with a cover for inclosing the same in order to protect the driving mechanism from the dirt and dust.

The operation of my improved driving mechanism as applied to a stone sawing machine as herein shown and described, is as follows: Supposing that the driving belts from the driving shaft are in the position shown upon the loose pulleys of the driven shaft. By shifting the uncrossed belt to the tight pulley, the driven shaft will be rotated and the gears carried thereby which mesh with the coöperating gears carried by the counter-shaft will be rotated and as these speed-changing gears of the counter-shaft, are free to rotate upon the counter-shaft if the key is thrown out of engagement therewith, the counter-shaft will not be rotated. By shifting the double clutch member so as to throw the same into engagement with the bevel gear carried by the cross shaft, the shaft 49 will be rotated and through the medium of the sprocket chains and wheels the feed shaft or screw shaft 68 will be rotated in order to advance the carborundum wheel quickly upon the cross rail in position to operate upon the material being sawed. The clutch is then operated so as to shift the same from the bevel gear to the worm gear in order to lock the worm gear to the shaft and by shifting the key-shaft 42 within the tubular counter-shaft in such a position as to lock any one of the different-sized gears carried thereby, the counter-shaft will be rotated through the medium of the worm and worm gear and the cross shaft 49 will be rotated so as to advance the carriage upon the cross rail at the rate of speed desired and if it is desired to increase or decrease the travel of the carriage upon the cross rail, the key-shaft is operated so as to throw the same into engagement with one of the other gears. If the belt shifters are operated so as to throw the reverse belt from the loose pulley to the tight pulley, the driven shaft will be rotated in a reverse direction and the above operation can be repeated in order to change the position of the carriage carrying the cutting head on the cross rail.

The bearing of the shaft 11 is adjustably mounted upon the cross rail 2 in order to adjust the tension of the belt by providing the bearings with slots through which the clamping bolts extend in order to allow the same to be adjusted longitudinally thereon and locked by the bolts, in adjusted position.

From the above description, it will be seen that by this construction, the carborundum wheel can be made to advance or move in either direction upon the cross rail at any rate of speed desired in order that after a cut has been made, the same can be thrown back into initial position quickly by shifting the speed-changing mechanism and thus slow or fast speed is accomplished in either direction.

I claim:

1. In a machine, the combination with a movable member, of a feed mechanism for moving said member, a driving shaft, a driven shaft having a driving connection with said driving shaft, a counter-shaft, coöperating change-speed gears carried by the driven and counter-shaft, a cross shaft, a driving connection between the cross shaft and feed mechanism, and a driving connection between the driven, counter and cross shafts.

2. In a machine, the combination with a movable member having a revoluble member, a feed shaft for said movable member, a driving shaft having a driving connection with said revoluble member, a driven shaft having a driving connection with said driving shaft, a counter-shaft, coöperating speed-change gears carried by the driving and counter shafts, a cross shaft having a driving connection with the feed shaft, a driving connection between said driven, counter and cross shafts, and means for independently locking any one of said speed-changing gears to the counter shaft.

3. In a machine, the combination with a feed shaft, a cross shaft for driving said feed shaft, a driven shaft, a counter-shaft, coöperating speed-change gears carried by the counter and driven shafts, driving connections between the cross shaft, counter-shaft and driven shaft, and means for independently locking the speed-change gears to the counter shaft.

4. In a machine, the combination with a feed mechanism, of a cross shaft having a driving connection therewith, a double clutch mounted upon said cross shaft, a worm wheel arranged upon said cross shaft, a beveled gear mounted upon said cross shaft, a driven shaft having a beveled pinion meshing with the pinion of the cross shaft, a counter-shaft having a worm meshing with the worm wheel, coöperating gears carried by the counter and driven shafts, and means for operating said clutch member for independently locking the beveled gear and worm wheel to the cross shaft.

5. In a machine, the combination with a feed mechanism, of a cross shaft having a driving connection therewith, a driven shaft, a driving connection between the driven shaft and cross shaft, a counter-shaft, a driving connection between the counter-shaft and cross shaft, and coöperating change-speed gears carried by the counter and driven shafts.

6. In a machine, the combination with a feed shaft, a cross shaft, a driving connection between the cross shaft and feed shaft, a driven shaft, a counter-shaft, coöperating speed-change gears carried by the driven and counter-shafts, means for independently locking the change-speed gears of the counter-shaft thereto, and driving connections between the counter-shaft and cross shaft and driven shaft.

7. In a machine, the combination with a feed shaft, of a cross shaft, a driving connection between the cross shaft and feed shaft, loosely mounted driving members mounted upon said cross shaft provided with clutch members, a counter-shaft, a driven shaft, coöperating driving members carried by the counter and driven shafts, coöperating gears carried by the counter and driven shafts, and means for independently locking the loosely mounted driving members of the cross shaft.

8. In a machine, the combination with a feed shaft, of a cross shaft having a driving connection therewith, change-speed mechanism having a driving connection with the cross shaft, a driving shaft, means for driving said change-speed mechanism from said driving shaft, and means for reversing the driving means from the driving shaft.

9. In a driving mechanism, comprising a driven shaft, a counter-shaft, coöperating change-speed gears carried by said shafts, means for independently locking the change-speed gears of the counter shaft thereto, a cross shaft, a driving connection between the cross shaft and driven shaft, a driving connection between the counter-shaft and cross shaft, and means for throwing said driving connections between the counter, driven and cross shafts into operation.

10. A driving mechanism, comprising a driven shaft having a plurality of change-speed gears fixed thereto, a counter-shaft having a plurality of loosely mounted change-speed gears coöperating with the change-speed gears of the driven shaft, means for independently locking the change-speed gears of the counter-shaft thereto, a cross shaft, a beveled gear loosely mounted upon said cross shaft provided with a clutch member, a beveled pinion carried by the driven shaft meshing with the beveled gear of the cross shaft, a worm wheel loosely mounted upon the cross shaft provided with a clutch member, a worm carried by the counter-shaft meshing with the worm wheel of the cross shaft, and a clutch member feathered on said cross shaft for locking either the worm wheel or beveled gear thereto.

11. A driving mechanism, comprising a driven shaft and a counter-shaft, a cross shaft, means for driving said cross shaft from either the driven shaft or counter-shaft, coöperating speed-change gears carried by the driven shaft and counter-shaft, independent means for locking said change-speed gears of the counter-shaft thereto, and means for driving said driven shaft in either direction.

12. In a machine, the combination with a movably mounted member, of driving mechanism, a feed shaft for said movable member, a cross shaft, sprockets carried respectively by the feed shaft and cross shaft, a chain passing over said sprockets, a driven shaft, a counter-shaft, coöperating change-speed gears carried by the driven shaft and counter-shaft, and means for driving said cross shaft from either the driven or counter-shaft.

13. A driving mechanism, comprising a driven shaft, means for driving said shaft in either direction, a counter-shaft, change-speed gears loosely mounted upon said counter-shaft, change-speed mechanism fixed upon said driven shaft, means for independently locking the change-speed gears to the counter-shaft, a cross shaft, and means for driving said cross shaft from either the counter-shaft or driven shaft.

14. A driving mechanism, comprising a cross shaft, a driving connection between said cross shaft and machine, spaced loosely mounted driving members arranged upon said cross shaft, a feathered locking member arranged upon said cross shaft, a driven shaft having a driving member coöperating with one of said driving members, a counter-shaft having a driving member coöperating with the other of said members, and a driving connection between the counter-shaft and driven shaft.

15. In a driving mechanism, the combination with a feed shaft, of a cross shaft having a driving connection therewith, a driven shaft having a driving connection with the cross shaft, a counter-shaft having a driving connection with the cross shaft, said counter-shaft being provided with a tubular portion, change-speed gears loosely mounted upon said tubular portion, coöperating change-speed gears fixed upon the driven shaft, and a key-shaft mounted in said tubular portion of the counter-shaft having a movable key for independently locking the change-speed gears thereto.

16. In a machine, the combination with the feed shaft thereof, of a cross shaft having a driving connection therewith, a driven shaft having a driving connection with the cross shaft, a counter-shaft having a driving connection with the cross shaft, coöperating change-speed gears carried by the counter-shaft and driven shaft, means for locking either the driving connection of the counter-shaft or driven shaft to the cross shaft, and means for driving the driven shaft in either direction.

17. In a machine, the combination with a movable member, of a feed shaft therefor, a driving shaft, a driven shaft, a driving connection between said driven shaft and driving shaft, a counter-shaft, coöperating change-speed gears carried by the counter-shaft and driven shaft, a cross shaft, a driving connection between the cross shaft and feed shaft, a driving connection between the counter-shaft and cross shaft, and a driving connection between the driven shaft and cross shaft.

18. A driving mechanism, comprising a driven shaft and a counter-shaft, speed-changing gears carried by the driven shaft, speed-changing gears carried by the counter-shaft, means for independently locking the change-speed gears of the counter-shaft thereto, a cross shaft, and means for driving the cross shaft from either the counter-shaft or driven shaft.

19. A driving mechanism, comprising a driven shaft, a plurality of speed-change gears fixed thereto, a tubular slotted counter-shaft, a plurality of loosely mounted change-speed gears carried thereby, collars separating said change-speed gears from said counter-shaft, a key-shaft slidably mounted within said tubular shaft, and a pivoted key carried by said key-shaft for independently locking said speed-changing gears thereto.

20. A driving mechanism, comprising a housing parallel shafts mounted in said housing, a driving shaft, a driving connection between the driving shaft and one of said first-mentioned shafts, coöperating change-speed gears carried by the parallel shafts, a cross shaft, and means for driving said cross shaft from either one of the parallel shafts.

21. A driving mechanism, comprising a housing, a cross shaft mounted in said housing for driving the feed of said machine, loosely mounted driving members mounted upon said cross shaft having clutch faces, a double clutch mounted upon said cross shaft for locking either of said loosely mounted driving members thereto, a driven shaft having a connection with one of said driving members, a counter-shaft having a connection with the other of said driving members, coöperating change-speed gears carried by said counter-shaft and driven shaft, and means for driving the driven shaft in either direction.

22. A driving mechanism, comprising a housing having oil cups, a counter-shaft, a driven shaft, coöperating change-speed gears carried by said shaft arranged within one of said oil cups, a cross shaft, driven gears carried by the cross shaft arranged within the other of said oil cups, and coöperating driving gears carried by the counter-shaft and driven shaft.

23. A driving mechanism, comprising a cross shaft having a driving connection with the feed screw thereof, a driving shaft having a driving connection with the cutting member thereof, a driven shaft, means for driving said driven shaft from said driving shaft in either direction, means for driving said cross shaft from said driven shaft, a counter-shaft, means for driving said cross shaft from said counter-shaft, coöperating change-speed gears carried by said counter-shaft and driven shaft, and means for independently locking the change-speed gears of the counter-shaft thereto.

24. In a driving mechanism, the combination with a driven shaft, of a counter-shaft, change-speed gears carried by the driven shaft, change-speed gears loosely mounted upon the counter-shaft, a cross shaft, means for driving said cross shaft from either the counter-shaft or driven shaft, and means for independently locking the change-speed gears of the counter-shaft thereto.

25. In a driving mechanism, the combination with a housing, of a cross shaft having a driving connection with the feed of said machine, a driving shaft having a connection with the cutting member of said machine, a driven shaft, a driving connection between said driven shaft and driving shaft, a driving connection between said driven shaft and cross shaft, and means for reversing the movement of said driven shaft.

26. The combination with a mechanism having a movable member carrying a rotary member, of a driving shaft having a driving connection with the rotary member, a feed shaft in said movable member, a cross shaft having a driving connection with the feed shaft, a driven shaft, means for driving said driven shaft from said driving shaft in either direction, a worm wheel mounted upon said cross shaft, a beveled gear mounted upon said cross shaft, means for locking either said worm wheel or beveled gear thereto, a counter shaft having a coöperating member for said worm wheel, a driven shaft having a coöperating member for said beveled gear, and a driving connection between said counter-shaft and driven shaft.

27. A driving mechanism, comprising a driven shaft, a counter-shaft, coöperating change-speed gears carried by the driven shaft and counter shaft, manually operated means for locking said change-speed gears of the counter-shaft independently thereto, a cross shaft, loosely mounted driving members carried by the cross shaft, coöperating members carried by the counter-shaft and driven shaft, and manually operative means for locking either of the loosely mounted driving members of the cross shaft thereto.

28. A machine, a movable member, a rotary member carried by said movable member, a feed shaft for said movable member, a driving shaft, a driving connection from said driving shaft to said rotary member, a cross shaft, a driving connection from said cross shaft to said feed shaft, loosely mounted driving members mounted upon said cross shaft, a driven shaft having a coöperating driving member meshing with one of said driving members, a counter-shaft having a coöperating driving member meshing with the other of said driving members of the cross shaft, coöperating change-speed gears carried by said counter-shaft and driven shaft, driving belts from said driving shaft to said driven shaft, means for shifting said belts, and means for locking either of the driving members carried by the counter-shaft thereto.

29. A driving mechanism, comprising a driven shaft, means for driving said shaft in either direction, a cross shaft having a driving connection with the feed of the machine, a driving connection between said driven shaft and cross shaft, a counter-shaft, a driving connection between the counter-shaft and cross shaft, change-speed gears loosely mounted upon said counter-shaft, collars arranged between said change-speed gears, coöperating change-speed gears carried by the driven shaft, and a slidably mounted key for independently locking said change-speed gears to the counter-shaft.

30. A driving mechanism, comprising a driven shaft, a plurality of change-speed gears fixed upon said shaft, a tubular longitudinally slotted counter-shaft, a plurality of loosely mounted change-speed gears carried by said counter-shaft, collars arranged between said change-speed gears of the counter-shaft, a key-shaft slidably mounted within said counter-shaft, a handle swiveled on one end of said key-shaft, said key-shaft being provided with a recess, a spring-actuated key mounted within said recess of the key-shaft for independently locking or releasing the change-speed gears carried thereby, a cross shaft, and means for driving said cross shaft from the counter-shaft or driven shaft.

31. A change-speed mechanism for machines, comprising a cross shaft having a driving connection with the feed shaft thereof, a counter-shaft having a longitudinally slotted tubular portion, a driven shaft, means for driving said cross shaft from either the counter-shaft or driven shaft, a plurality of change-speed gears carried by the counter-shaft and driven shaft, and means for driving said driven shaft in either direction.

32. A change-speed mechanism for machines, comprising a cross shaft having a driving connection with the feed shaft thereof, of a driven shaft, a counter-shaft, means for driving said cross shaft from the counter-shaft or driven shaft, a plurality of change-speed gears fixed on said driven shaft, said counter-shaft being provided with a longitudinally slotted tubular portion, a plurality of change-speed gears loosely mounted upon said tubular portion of the counter-shaft, collars arranged between said change-speed gears, a slidably mounted key arranged within said counter-shaft, and a pivotally mounted spring-actuated key carried by said key-shaft for independently locking the change-speed gears of the counter-shaft thereto.

In testimony whereof I affix my signature in presence of two witnesses.

EDSON T. POLLARD.

Witnesses:
EDNAH E. POLLARD,
MARY F. POLLARD.

Copies of this patent may be obtained for five cents each, by addressing the "Commissioner of Patents, Washington, D. C."